United States Patent
Hester

(10) Patent No.: US 7,108,880 B2
(45) Date of Patent: Sep. 19, 2006

(54) CONFECTIONERY COMPOSITION AND METHODS OF USING THE SAME FOR DECORATING

(75) Inventor: Michele Hester, Waldron, MO (US)

(73) Assignee: Waldron LLC, Waldron, MO (US)

( * ) Notice: Subject to any disclaimer, the term of this patent is extended or adjusted under 35 U.S.C. 154(b) by 270 days.

(21) Appl. No.: 10/366,964

(22) Filed: Feb. 14, 2003

(65) Prior Publication Data
US 2004/0161510 A1 Aug. 19, 2004

(51) Int. Cl.
*A23P 1/08* (2006.01)
(52) U.S. Cl. .................. 426/383; 426/104; 426/656; 426/658
(58) Field of Classification Search ............... 426/104, 426/656, 658, 383
See application file for complete search history.

(56) References Cited

U.S. PATENT DOCUMENTS

| | | | | |
|---|---|---|---|---|
| 1,788,493 | A | * 1/1931 | Olschewsky | 426/289 |
| 5,035,907 | A | * 7/1991 | Phillips et al. | 426/383 |
| 5,505,775 | A | * 4/1996 | Kitos | 118/14 |
| 5,579,960 | A | 12/1996 | Scott | |
| 5,587,198 | A | 12/1996 | Cherukuri et al. | |
| 6,432,460 | B1 | 8/2002 | Zietlow et al. | |
| 6,432,461 | B1 | * 8/2002 | Dixon | 426/104 |
| 6,482,465 | B1 | 11/2002 | Cherukuri et al. | |
| 6,652,897 | B1 | * 11/2003 | Stewart | |

FOREIGN PATENT DOCUMENTS

JP 06125719 * 5/1994

OTHER PUBLICATIONS

The Art of Baing. Taste of Romance, Jan. 2003 (3 pages).
C&H Bakers Drivert (1 page).
"Marshmallows," Technical Brief, Intermediate Technology Development Group, LTD Patron HRH (5 pages).

* cited by examiner

*Primary Examiner*—Anthony Weier
(74) *Attorney, Agent, or Firm*—Hovey Williams LLP

(57) ABSTRACT

Improved confectionery compositions and methods of using those compositions are provided. Broadly, the compositions have a sweetening ingredient, a proteinaceous material, and a thickening agent and can further have various additives such as colorants, flavoring agents, and preservatives. The compositions can be provided in the form of a dry mix which can be stored for long periods of time, or in the form of a ready-to-use composition. The final hydrated icing compositions flow readily through extremely small apertures (e.g., 18–24 gauge) and thus can be formed into detailed and complex patterns by even those with little skill in the art. The patterns can also be formed on a release substrate and packaged for sale directly to consumers or to bakeries.

14 Claims, 2 Drawing Sheets

CONFECTIONERY COMPOSITION AND METHODS OF USING THE SAME FOR DECORATING

BACKGROUND OF THE INVENTION

1. Field of the Invention

The present invention is broadly concerned with novel confectionery or icing compositions and methods of using those compositions to form intricate decorations for cakes, cookies, and other baked goods as well as candies, confectionery items, plated desserts, and other desserts.

2. Description of the Prior Art

Numerous icing compositions have been prepared in the past, however, each of these compositions has suffered from drawbacks. For example, prior art compositions have been very thick and dense, thus making it extremely difficult or impossible for cake decorators to extrude or squeeze the material through very small apertures. As a result, pastry bags utilized by decorators have included dispensing tips whose apertures were 16 gauge or a lower gauge (i.e., 1.193 mm or larger apertures—the lower the gauge, the larger the aperture size) which prevented the decorator from using the compositions to easily make fine lines and detailed, intricate patterns. Furthermore, even at these gauge sizes, decorators are required to apply a great deal of force to the pastry bag to cause the prior art icing compositions to pass through the apertures. This force causes great strain on the hands and wrists of the decorators, making this process exhausting and sometimes painful.

Another problem with prior art compositions is that forming patterns with pastry bags requires a great deal of time and skill by the decorator. This is particularly true when decorating the sides of a cake. This problem greatly limits the options of the non-professional who desires a decoration that was more than just a simple message or basic flowers, swirls, or other patterns. The non-professional must rely on a professional to provide these decorations at a cost, and even then the pattern may have been too intricate or fine even for the professional with a pastry bag as discussed above.

Furthermore, with prior art compositions and decorating methods, it is necessary to form the patterns "on the cake." That is, after a cake is baked or thawed if frozen, it must wait to be decorated. As a result, there is a risk that the cake will become stale, or at least lose some of its freshness, while waiting to be decorated.

Thus, there is a need for icing compositions and decorating methods which can readily be utilized by novices and professionals alike, and which can be used to form complex patterns with relative ease and by a wide variety of methods.

SUMMARY OF THE INVENTION

The present invention is broadly concerned with a novel confectionery compositions and methods of using these compositions to decorate items such as baked goods. The invention is further directed towards pre-fabricated decorations which can be used by less experienced decorators to provide attractive and complex decorative patterns.

In more detail, the inventive compositions include a sweetening ingredient, a proteinaceous material, and a thickening agent. Preferred sweetening ingredients include saccharides such as sugars. As used herein, the term "sugars" is intended to refer to both granulated and powdered sugars as well as liquid sugars such as corn syrup (i.e., glucose syrup) solids and honey and mixtures of the foregoing. Preferred sugars include invert sugars and those selected from the group consisting of sucrose, glucose, fructose, lactose, maltose, fondant sugars, and mixtures thereof. Other sweetening ingredients such as polyols, alitame, polydextrose, saccharin, sucralose, aspartame, and acesulfame-K are suitable as well. The sweetening ingredient is preferably present in the composition at a level of from about 65–95% by weight, and more preferably from about 75–90% by weight, based upon the total weight of solids in the composition taken as 100% by weight.

Preferred proteinaceous materials include egg whites (albumin), soy proteins, whey proteins, protein isolates (soy, pea, rapeseed, etc.), and mixtures thereof. The proteinaceous material is preferably provided as a powder and should be present in the composition at sufficient levels to provide from about 5–15% by weight protein, and more preferably from about 7–11% by weight protein, based upon the total weight of solids in the composition taken as 100% by weight.

The thickening agents utilized in the inventive compositions can be any thickening agent that is safe for consumption. Suitable thickening agents include starches and starch derivatives (e.g., cornstarch, tapioca, rice starch, potato starch), gums (e.g., xanthan, gum arabic, guar gum, ghatti gum, Karaya gum, tragacanth gum, carob-seed or locust-bean gum, dextrin or vegetable gum, larch gum), colloids (both hydro- and phyco-, e.g., agar, carrageenan, algin, calcium alginate, pectin, propylene glycol alginate, furcelleran), celluloses (e.g., carboxymethyl cellulose), casein, gelatin, and mixtures of the foregoing. Other examples of thickening agents include cyclodextrins, scleroglucan, dextran, sodium carboxymethylcellulose, and hydroxypropyl methylcellulose. The thickening agent is preferably present in the composition at a level of from about 0.01–7.0% by weight, and more preferably from about 0.5–3.0% by weight, based upon the total weight of solids in the composition taken as 100% by weight.

In addition to the foregoing ingredients, the inventive compositions can further include various additives. Some suitable additives include maltodextrins, oils or fats, cream of tartar, citric acid, glycerin, salt, preservatives, microbicides, calcium, colorants, flavoring agents, glycerin, tartaric acid, and mixtures of the foregoing. It will be appreciated that the quantity of additives utilized will depend upon the particular additive(s), but typical total additive levels will be up to about 4% by weight, and more preferably from about 0.05–2.5% by weight, based upon the total weight of solids in the composition taken as 100% by weight.

The foregoing ingredients can be provided in the form of a dry mixture which can be stored until needed at which time the user would add sufficient levels of water to form a flowable icing composition. Alternately, the inventive composition can be provided as a ready-to-use icing composition so that sufficient water levels have already been provided. In either instance, the level of water utilized should be from about 35–55% by weight, and more preferably from about 40–50% by weight, based upon the total weight of solids in the composition taken as 100% by weight. Furthermore, although cold water can be utilized, it is preferred that the temperature of the water be at least about 75° F., preferably at least about 125° F., and more preferably from about 200–230° F. during adding thereof to the dry ingredients.

The dry mix compositions are formed by simply forming a mixture of the foregoing ingredients (excluding the water).

The final icing composition is formed by adding the appropriate levels of water to the dry mix composition followed by mixing at low speed (preferably about 22–24 rpm) for about 30–90 seconds, and preferably about 60 seconds, followed by mixing at medium speed (preferably about 31–32 rpm) for about 3–5 minutes, and preferably about 3 minutes.

The resulting icing composition will have a pH of from about 6–8, and more preferably from about 7.0–7.5, and a water activity of from about 0.500–1.200, and more preferably from about 0.800–0.900. Furthermore, this composition will have a low density and a certain viscosity, thus making it more versatile for intricate decorations when compared to prior art compositions. More particularly, the final hydrated composition will have a Brookfield viscosity (determined on a SYNCHRO-LECTRIC Viscometer; Model No. RVF-62049) at about 72° F. of from about 1,500–140,000 cP, preferably from about 3,000–110,000 cP, and more preferably from about 65,000–88,000 cP, and a density of less than about 8 lbs/gal and preferably from about 3–6 lbs/gal.

As will be appreciated by those skilled in the art, the final composition can be subjected to a wide range of processes that will allow intricate decorative patterns to be formed, even by persons lacking high levels of skill in this area. Furthermore, the compositions can be used to form decorative patterns (either bulk prepared or specially ordered) which are packaged for later use by consumers, including individual consumers as well as bakery establishments, restaurants, etc. These methods are discussed in more detail below.

DETAILED DESCRIPTION OF THE PREFERRED EMBODIMENTS

EXAMPLES

Figure 1:
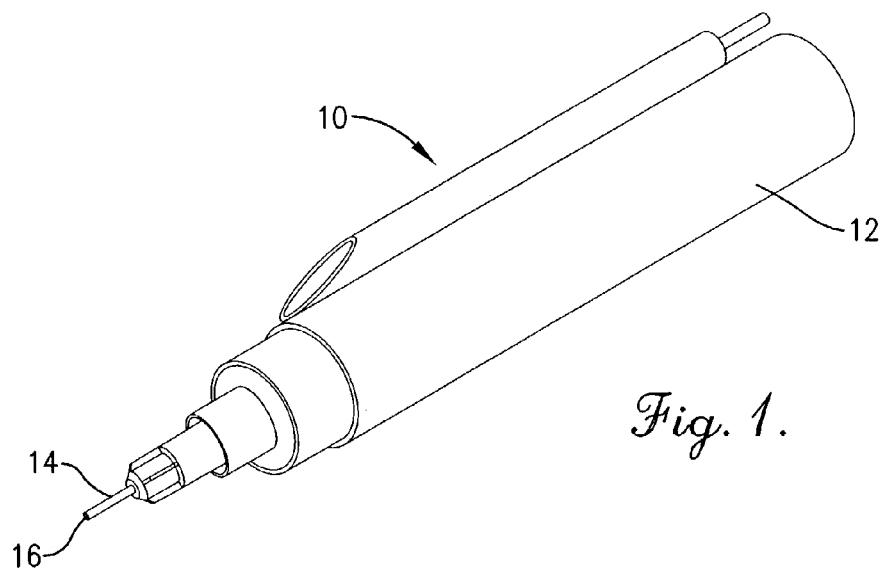
FIG. 1 is a schematic illustration of an air-powered dispensing pen which can be used to dispense the inventive compositions according to one embodiment of the invention.

The following examples set forth preferred methods in accordance with the invention. It is to be understood, however, that these examples are provided by way of illustration and nothing therein should be taken as a limitation upon the overall scope of the invention.

Preparation of Icing Compositions

A dry mix was prepared by mixing the ingredients shown in Table 1.

TABLE 1

| INGREDIENT | WEIGHT (g) |
| --- | --- |
| Sugar[a] | 50.5 |
| Dried egg white[b] | 5.6 |
| Starch[c] | 0.3 |

TABLE 1-continued

| INGREDIENT | WEIGHT (g) |
| --- | --- |
| Xanthan Gum[d] | 0.3 |
| Maltodextrin[e] | 1.0 |

[a]Sucrose and invert sugar; sold under the name C&H BAKERS DRIVERT; available from C&H Pure Cane Sugar, Crockett, CA.
[b]Sold under the name JUST WHITES; Produced by Deb-El Foods; available from Liberty Richter, Saddle Brook, NJ.
[c]Sold under the name MIRA-GEL 463; available from A. E. Staley Manufacturing Company, Decatur, IL.
[d]Sold under the name GUMIXAN K; available from Gumix International, Inc., Fort Lee, NJ.
[e]Sold under the name STAR-DRI 1; available from A. E. Staley Manufacturing Company, Decatur, IL.

The resulting dry mix was then used to prepare an icing composition. First, 5 teaspoons of boiling water was added to ¼ cup of the dry mix followed by stirring to combine. The mixture was beaten for 22–24 rpm for about 1 minute. The mixing speed was then increased to 31–32 rpm for about 3 minutes. This composition was capable of being passed through an aperture as small as 25 gauge. When subjected to the stretching and hardness tests described hereinafter, this composition yielded a % stretching of 50% and an ASTM D 3363-00 hardness of 5B. The resulting icing composition was then ready to be used for small aperture decorating as described below.

Decorating with the Inventive Composition

It will be appreciated that the above-described icing composition can be used in a wide number of methods to form complex and intricate icing decorations. One significant reason for this capability is that the flowable composition can be passed through or extruded through rather narrow opens such as that found in an air-powered dispensing pen 10 shown in FIG. 1. Pen 10 is described in detail in U.S. Pat. No. 5,579,960, incorporated herein by reference. Briefly, pen 10 is a pneumatic dispenser which includes a tubular barrel 12 and a dispensing nozzle 14. As described in U.S. Pat. No. 5,579,960, the pen 10 is designed to pneumatically "force" a material through nozzle 14, typically at pressures of from about 2–8 psi, with the nozzle 14 having an outlet 16 that is as small as 24 gauge. Prior art icing compositions were not capable of smoothly and evenly flowing through such a small aperture or outlet. Thus, according to the present invention, the icing composition can pass through openings that are about 18 gauge or a larger gauge (i.e., apertures that are about 0.838 mm or smaller at their maximum dimension), more preferably about 18–24 gauge (i.e., about 0.838 mm down to about 0.330 mm), and even more preferably about 19–22 gauge (i.e., about 0.711 mm down to about 0.406 mm). These gauges can be used at pressures of less than about 10 psi, and preferably from about 4–5 psi, which is much lower than prior art pressures Using a device such as the pen 10 in conjunction with the inventive icing compositions allows for elaborate decorations to be achieved. For example, FIG. 2 depicts a sculpted, decorated baked good 18 which includes a cake 20 and a decorative icing pattern 22. Cake 20 has a number of protuberances 24a–f separated by valleys 26a–f thus creating a cake 20 with an extremely uneven upper surface which would be very difficult or impossible to decorate with prior are compositions and methods. However, by following the present invention, the detailed and elaborate pattern 22 was achieved by forming a starter pattern on a release substrate (e.g., greased parchment). The starter pattern was then allowed to "set" until it was sufficiently firm to remove from the substrate but still sufficiently flexible to conform to the shape of the cake 20 without breaking or crumbling. The "set" time varies depending upon the humidity levels, but will generally be from about 15 minutes in a humidity controlled environment to overnight. The setting process can be expedited with the use of a heat lamp or other heat source. At ambient conditions, the pattern 22 will remain flexible over extended periods of time (e.g., at least about 3 days) so that it can be removed from the release substrate in a cohesive manner while still remaining flexible.

The flexibility of the set material can be determined by a stretching test as well as by a hardness test. The stretching test as used herein is carried out at ambient conditions (e.g., 68–72° F. and 30–34% RH). In this test, lines of icing are formed on a substrate (e.g., greased parchment) by passing an icing composition through an 18 gauge aperture at a pressure of 4 psi.

The lines are allowed to "set" for 2 hours at which point they are cut into 2-inch sections. The 2-inch sections are individually stretched lengthwise, by hand, until they break into two pieces. The length at which breakage occurs is recorded. The percent stretching is determined as follows:

$$\% \text{ stretching} = \left(\frac{\text{length at breakage (in.)} - 2 \text{ in.}}{2 \text{ in.}}\right) \times 100.$$

The test is carried out 3 times for a particular composition, and the average of these three measurements is determined. This average is the % stretching of that composition. Compositions according to the invention will have a % stretching of at least about 25%, preferably at least about 40%, and more preferably at least about 50%.

The hardness test as used herein is carried out at ambient conditions (e.g., 68–72° F. and 30–34% RH). In this test, a 2 in.×2 in. section of icing composition is formed on a rigid substrate (e.g., polystyrene). The icing section should have an average thickness of about 0.020–0.025 in. The section of icing is allowed to set for 2 hours at which point it is subjected to the hardness test described in ASTM D 3363-00 (the test is followed exactly except for the differences set forth above). Compositions according to the invention will have an ASTM D 3363-00 hardness of no harder than 4B, and more preferably 5B or 6B.

FIG. 2 illustrates the advantages this icing composition possesses. In particular, it can be seen that the pattern 22 has sufficient flexibility to conform to the shape of protuberances 24a–f while simultaneously possessing sufficient shape to drape over valleys 26a–f without breaking. This is particularly advantageous because it allows for a variety of surfaces to be decorated and because even so-called "flat" surfaces are generally not in reality flat. The pattern 22 can be applied to vertical surfaces as well as horizontal surfaces, and the pattern 22 will readily adhere to these surfaces, particularly when applied to a base coating of icing. Furthermore, very thin lines of icing can be formed, with these lines having the gauge sizes discussed above (e.g., less than about 0.838 mm).

It will be greatly appreciated that the present invention allows for much quicker decorating times and because of the flow properties avoids the need for excessive squeezing of pastry bags which can cause pain in the carpal tunnel muscles of the decorator regardless of whether the decorator is a novice or highly experienced. Furthermore, the invention allows novices to prepare complex decorations that were previously best left to professionals.

Figure 3:
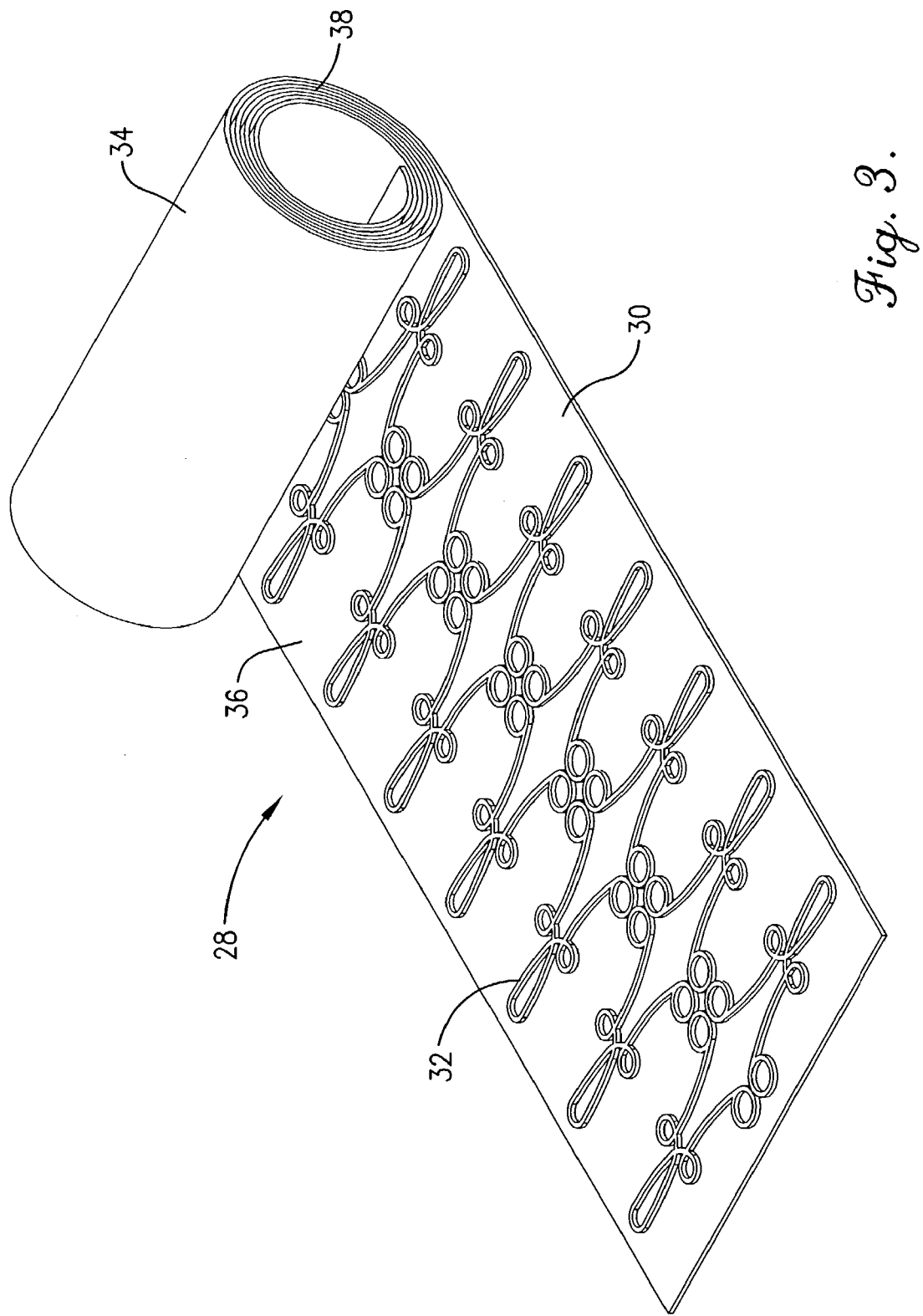
FIG. 3 is a schematic illustration of a ready-to-use decorative pattern mounted on a release substrate according to the invention.

FIG. 3 depicts another embodiment of the present invention. In this embodiment, a prepackaged decorating kit 28 is provided. This kit 28 includes a release substrate 30 and decoration 32 formed from the inventive icing composition. Release substrate 30 includes a lower major surface 34 and an upper major surface 36. Lower surface 34 should be formed of a material which will not adhere to decoration 32 while upper surface 36 should be formed of a material which will temporarily adhere to decoration 32. That is, upper surface 36 must adhere to decoration 32 sufficiently to keep decoration 32 in place and protected from damage, but must allow decoration 32 to be easily separated therefrom by the user. Examples of suitable release substrates 30 include greased parchment paper, silicone-coated films and papers, greased/waxed papers, and release liner film. In the embodiment of FIG. 3, it can be seen that the substrate 30 can conveniently be rolled so as to form a series of convolutions 38 and allow for easy storage.

In this embodiment, the kit 28 can be packaged and sold to consumers so that novices can easily apply an attractive decoration to a cake or other baked good. The kits 28 can be manufactured in bulk using patterns, numbers, lettering, messages, etc. determined by the manufacturer for purchase directly by an individual consumer or for storage by a baked goods store in its inventory to provide for rapid and facile decorating by the consumer or the bakery. Particularly lengthy storage periods prior to use can be facilitated by the use of packaging techniques to account for the storage time (e.g., the use of a glycerin pad in the packaging to retain moisture).

As an alternative to bulk manufacturing, a personalized ordering service can be provided whereby a consumer places an order (via a phone call, via the internet, in person, etc.) for a specific pattern, message, etc. with a company such as a bakery. The company can then prepare the kit 28 for delivery to, or pick up by, the consumer for application at the convenience of the consumer. Alternately, the company can prepare a baked good decorated with decoration 32 from kit 28 for delivery to, or pick up by, the consumer. Either way, this allows for a decoration to be formed off the cake or other baked good for transfer onto a fresh cake or baked good, thus avoiding the problem of the cake or baked good becoming stale prior to decorating.

The inventive compositions and methods allow for a pattern to be traced by a decorator. This has the benefit of assisting individuals who are less artistically talented while also making the process faster and easier for other individuals. In this method, a piece of cellophane, parchment, or other transparent or semi-transparent material is placed directly on top of a pattern, script, etc. and the design can be easily traced with the inventive icing and stored for future use as discussed previously, or used immediately after they have set.

While the foregoing description has focused on the use of air-powered dispensing pen 10 to form the decorative patterns, a number of other methods can be utilized as well. For example, it is contemplated that the icing compositions could be formed into patterns by any extrusion apparatus, including the use of conventional pastry bags. Or, the pen 10 or other dispensing device could be operably connected to a plotter such as those used to make blueprints so that a pattern can be drawn by computer. Furthermore, the patterns can be formed by depositing (on a substrate or in molds) the icing composition, by silkscreening, by stenciling, or by spraying. Finally, while the foregoing discussion of the preferred embodiments has focused on cakes, it will be appreciated that the inventive compositions and methods can be used to decorate cookies and other baked goods, candies, confectionery items, plated desserts, and other desserts.

Figure 2:
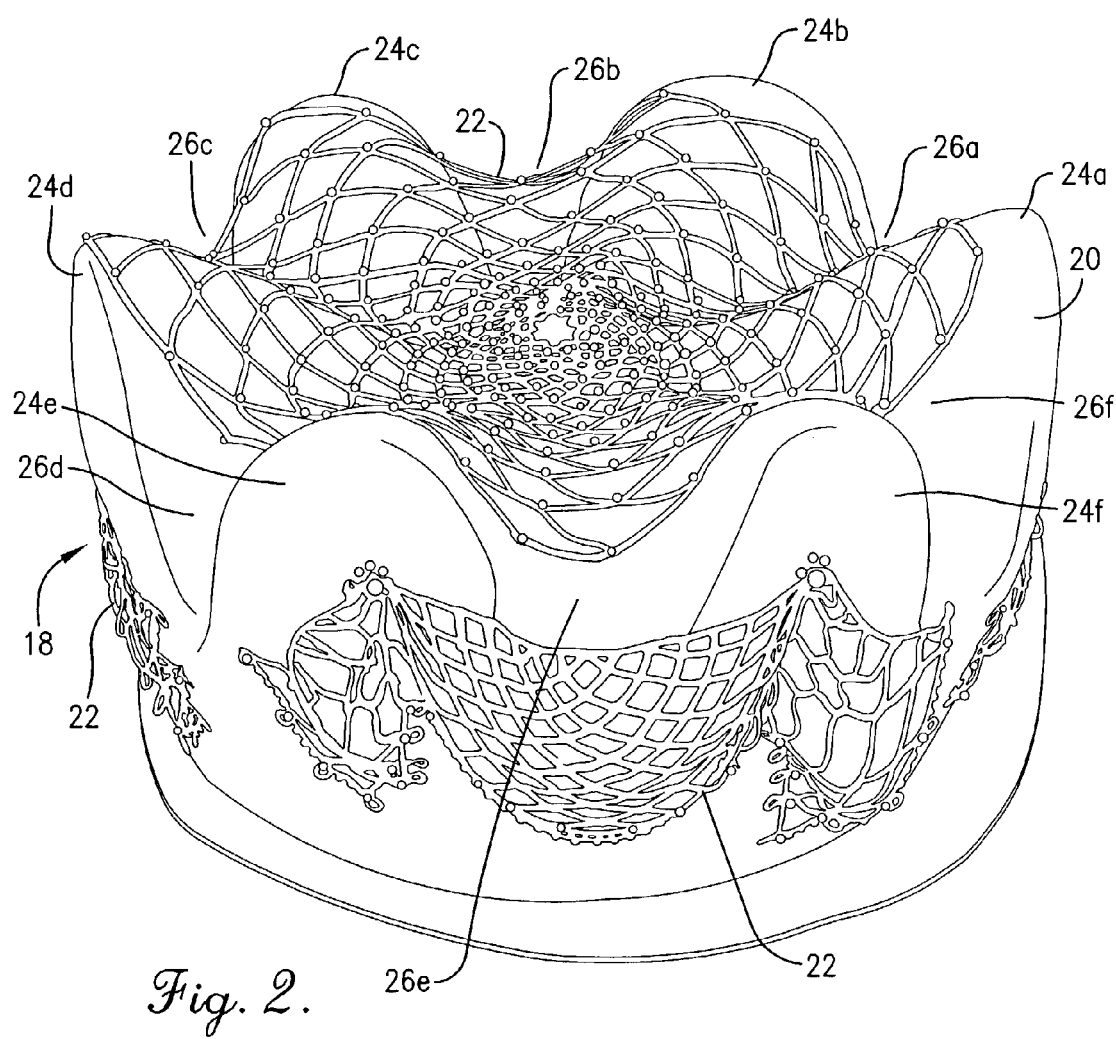
FIG. 2 is a schematic illustration of a sculpted cake decorated with an intricate pattern using compositions and methods according to the invention.

Also, while the pen 10 in FIG. 1 was described as including a nozzle 14, it will be appreciated that other dispensing tips are suitable as well including the TT series of dispensing tips and the tapered polyethylene tips by Techon Systems, Inc., Garden Grove, Calif.

I claim:

1. The combination of:
   a substrate presenting a pair of opposed major surfaces; and
   a decoration for baked goods supported on one of said major surfaces, said decoration formed of an edible icing material which remains flexible over an extended storage period at ambient conditions, said decoration being strippable from said one major surface while remaining cohesive and flexible, said edible icing material having a % stretching of at least about 25% when subjected to a stretching test.

2. The combination of claim 1, said substrate being in roll form and presenting a series of convolutions, the decoration supported on said one major surface being in contact with the opposed major surface throughout at least a portion of said convolutions.

3. The combination of claim 1, wherein said decoration comprises a series of identical repeating patterns.

4. The combination of claim 1, wherein said decoration comprises a plurality of elongated, string-like sections, said sections having a maximum thickness of less than about 0.838 mm.

5. The combination of claim 1, said decoration being formed by passing a composition through an aperture having a maximum dimension of less than about 0.838 mm, said composition comprising a sweetening ingredient, a proteinaceous material, and a thickening agent.

6. The combination of claim 1, wherein said decoration comprises a plurality of elongated, string-like sections in the form of a lace pattern.

7. The combination of:
   a substrate presenting a pair of opposed major surfaces; and
   a decoration for baked goods supported on one of said major surfaces, said decoration formed of an edible icing material which remains flexible over an extended storage period at ambient conditions, said decoration being strippable from said one major surface while remaining cohesive and flexible, said edible icing material having a hardness of 4B or softer when subjected to a hardness test and a % stretching of at least about 25% when subjected to a stretching test.

8. The combination of claim 7, said substrate being in roll form and presenting a series of convolutions, the decoration supported on said one major surface being in contact with the opposed major surface throughout at least a portion of said convolutions.

9. The combination of claim 7, wherein said decoration comprises a series of identical repeating patterns.

10. The combination of claim 7, wherein said decoration comprises a plurality of elongated, string-like sections, said sections having a maximum thickness of less than about 0.838 mm.

11. The combination of claim 7, said decoration being formed by passing a composition through an aperture having a maximum dimension of less than about 0.838 mm, said composition comprising a sweetening ingredient, a proteinaceous material, and a thickening agent.

12. The combination of claim 7, wherein said decoration comprises a plurality of elongated, string-like sections in the form of a lace pattern.

13. The combination of:
    an edible item selected from the group consisting of baked goods, candies, confectionery items, and desserts; and
    a decoration supported on said edible item, said decoration formed of an edible icing material which remains flexible over an extended storage period at ambient conditions, said decoration being strippable from a substrate surface while remaining cohesive and flexible, said edible icing material having a % stretching of at least about 25% when subjected to a stretching test.

14. The combination of:
    an edible item selected from the group consisting of baked goods, candies, confectionery items, and desserts; and
    a decoration supported on said edible item, said decoration formed of an edible icing material which remains flexible over an extended storage period at ambient conditions, said decoration being strippable from a substrate surface while remaining cohesive and flexible, said edible icing material having a hardness of 4B or softer when subjected to a hardness test and a % stretching of at least about 25% when subjected to a stretching test.

* * * * *